(12) United States Patent
Harder et al.

(10) Patent No.: US 8,324,307 B2
(45) Date of Patent: Dec. 4, 2012

(54) HIGH-TEMPERATURE POLYAMIDE MOLDING COMPOUNDS REINFORCED WITH FLAT GLASS FIBERS

(75) Inventors: Philipp Harder, Chur (CH); Thomas Jeltsch, Domat/Ems (CH); Nikolai Lamberts, Bonaduz (CH)

(73) Assignee: Ems-Patent AG, Domat/Ems (CH)

( * ) Notice: Subject to any disclaimer, the term of this patent is extended or adjusted under 35 U.S.C. 154(b) by 784 days.

(21) Appl. No.: 12/198,002

(22) Filed: Aug. 25, 2008

(65) Prior Publication Data

US 2009/0062452 A1 Mar. 5, 2009

(30) Foreign Application Priority Data

Aug. 24, 2007 (EP) .................................. 07016687

(51) Int. Cl.
- *C08K 3/40* (2006.01)
- *C08K 3/00* (2006.01)
- *C08G 18/34* (2006.01)
- *C08L 77/02* (2006.01)
- *C08L 77/04* (2006.01)

(52) U.S. Cl. .......................... 524/494; 524/514; 524/847

(58) Field of Classification Search .................. 524/414, 524/494, 495, 496, 514, 847
See application file for complete search history.

(56) References Cited

U.S. PATENT DOCUMENTS

| | | | | |
|---|---|---|---|---|
| 6,136,915 A | * | 10/2000 | Ohara et al. | 524/538 |
| 6,656,589 B2 | * | 12/2003 | Ogo et al. | 528/310 |
| 2005/0032958 A1 | * | 2/2005 | Bauer et al. | 524/415 |
| 2005/0288451 A1 | * | 12/2005 | Liedloff et al. | 525/432 |
| 2007/0117910 A1 | * | 5/2007 | Rexin et al. | 524/494 |
| 2007/0123632 A1 | * | 5/2007 | Rexin et al. | 524/494 |
| 2008/0274355 A1 | * | 11/2008 | Hewel | 428/402 |

FOREIGN PATENT DOCUMENTS

| | | |
|---|---|---|
| EP | 1 693 481 A1 | 8/2006 |
| JP | 07-18186 A | 1/1995 |
| JP | 07018186 A * | 1/1995 |
| JP | 2006-45390 A | 2/2006 |

OTHER PUBLICATIONS

Machine Translation of JP 07-018186.*

* cited by examiner

*Primary Examiner* — Ling Choi
*Assistant Examiner* — Darcy D LaClair
(74) *Attorney, Agent, or Firm* — Sughrue Mion, PLLC

(57) ABSTRACT

The present invention relates to reinforced polyamide molding compounds containing high-melting partially aromatic polyamides and flat glass fibers, in particular with a rectangular cross section, i.e., glass fibers with a noncircular cross-sectional area and a dimension ratio of the main cross-sectional axis to the secondary cross-sectional axis of 2 to 6, in particular 3 to 6, most especially preferably from 3.5 to 5.0. The present invention also relates to a method for manufacturing polyamide molding compounds and molded articles manufactured therefrom, i.e., in particular injection-molded parts. The inventive molded parts have a high transverse stiffness and transverse strength.

29 Claims, No Drawings

HIGH-TEMPERATURE POLYAMIDE MOLDING COMPOUNDS REINFORCED WITH FLAT GLASS FIBERS

CROSS-REFERENCE TO RELATED APPLICATIONS

The present application claims the benefit of European Patent Application EP 07 016 687.1 of Aug. 24, 2007, the entirety of which is incorporated herein by reference.

TECHNICAL FIELD

The present invention relates to reinforced polyamide molding compounds containing high-melting partially aromatic polyamides and flat glass fibers, in particular with a rectangular cross section, i.e., glass fibers with a noncircular cross-sectional area and a dimension ratio of the main cross-sectional axis to the secondary cross-sectional axis of 2 to 6, in particular 3 to 6, most especially preferably from 3.5 to 5.0. The present invention also relates to a method for manufacturing polyamide molding compounds and molded articles manufactured therefrom, i.e., in particular injection-molded parts. The inventive molded parts have a high transverse stiffness and transverse strength.

BACKGROUND OF THE INVENTION

High-melting polyamides are understood according to the present invention to be polyamides having a melting point of at least 270° C. (DSC, ISO 11357). The inventive polyamides have an HDT A (1.8 MPa) of at least 260° C. when reinforced with at least 50 wt % glass fibers.

Reinforced polyamides play an increasing role in the field of technical construction materials because in addition to having a high stiffness they also have a good impact strength and high deflection temperature. Areas of application include, for example, interior and exterior parts in the automotive sector and in the area of other transport means, housing materials for appliances and equipment for telecommunications, entertainment electronics, household appliances, mechanical engineering equipment, equipment in the heating field and fastening parts for installations. In parts for the automotive sector, for example, metal-like properties which are achieved only through highly filled reinforced molding compounds, however, are important. In the case of parts with thin walls, a high flow length of the molding compounds in particular is necessary, but this cannot be achieved at all or can only be achieved poorly when using conventional long and short glass fibers.

The particular advantage of reinforced polyamides is also the extraordinarily good bond between the polymer matrix and the reinforcing materials. This is also true even at high degrees of reinforcement leading to products with a high tensile E modulus. The impact strength, the transverse strength and stiffness as well as the deformation and processability of the products of the state of the art do not, however, meet all requirements, in particular when at the same time a high thermal stability and high deflection temperature are required.

In the present patent application, polyamides as used below are understood to refer to polymers whose basic building blocks are held together by amide linkages (NH—CO) and which can be synthesized by polycondensation or polymerization of monomers, e.g., dicarboxylic acids, dicarboxylic acid halides, dinitriles, diamines, aminocarboxylic acids and/or lactams. These may be homo- or copolyamides or mixtures thereof. The number average molecular weight of the polyamides should be more than 5,000, preferably more than 8,000 but less than 30,000, in particular less than 20,000 g/mol, corresponding to solution viscosities of $\eta_{rel}$ of less than 2.3, in particular $\eta_{rel}$ of less than 1.9, especially preferably $\eta_{rel}$ of less than 1.8 (measured in m-cresol, 0.5 wt %, 20° C.).

EP 0 196 194 B1 describes a strand comprising a plurality of individual filaments of glass having a noncircular cross section as well as the production thereof. The cross section of the glass fibers may be oval, elliptical, elliptical with constriction(s) (so-called cocoon fibers) or polygonal.

EP 0 246 620 B1 describes an object comprised of a glass fiber-reinforced thermoplastic material such that the glass fibers have a rectangular, elliptical or cocoon-shaped cross section. The cocoon-shaped cross section is understood in EP 0 246 620 B1 to refer to glass fibers having an elongated or oval shape or a curved shape, each with a constricted section. These glass fibers have an aspect ratio of 2.

EP 0 376 616 B1 describes a thermoplastic polymer comparison comprising a thermoplastic material and 1 to 65% of a fibrous reinforcement with a noncircular cross section, such that the cross-sectional area and the ratio of the cross-sectional axes of the reinforcing fibers perpendicular to one another are characterized in greater detail. The cross section of the reinforcing fibers has a curved or half-round contour. The composition is characterized by a high dimensional stability and low deformation.

To reduce the deformation of molded articles produced under thermoplastic conditions, according to JP 10219026 A2, the thermoplastic matrix is reinforced with a mixture of glass fibers having a circular cross section and glass fibers having a flat cross section. In the single example given in this document, polyamide 66 (nylon 66) is mentioned as the polymer matrix.

JP 2006045390 A2 describes granules reinforced with long glass fibers, comprising a thermoplastic matrix and up to 60 wt % glass fibers with a flat cross section. The granule length and the fiber length are identical. Advantageous properties of the molded articles produced from the reinforced composition according to JP 2006045390 A2 include a good surface quality and a high impact strength.

JP 8259808 A2 describes polyamide molding compounds comprising 50 to 80 wt % of a polyamide resin, preferably a polyamide 6 having a relative viscosity of 2.5 to 4.0 and 20 to 50 wt % flat fibers plus optionally up to 30 wt % of a filler.

EP 1 788 026 B1 describes reinforced polyamide molding compounds comprised of a blend of polyamide 66 and a copolyamide 6T/6I. A mixture of glass fibers and carbon fibers is used as the reinforcing material.

DISCLOSURE OF THE INVENTION

Problems to be Solved by the Invention

Therefore, it is an object of the present invention to provide novel reinforced polyamide molding compounds based on high-melting polyamides, i.e., with melting points of at least 270° C., which are definitely superior with regard to high deflection temperature, mechanical properties and processing properties in comparison with molding compounds containing glass fibers having a circular cross section. The molded articles produced from the molding compounds should also have a high transverse stiffness and transverse strength.

Means for Solving the Problem

The above object is achieved by a reinforced polyamide molding compound having a high notched impact strength, comprising a partially aromatic polyamide and a reinforcing medium, the improvement wherein
the polyamide comprises
a polyamide matrix, containing the following components:
(A) 20 to 60 wt % of at least one high-melting polyamide with a DSC melting point (ISO 11357) of at least 270° C., preferably having a solution viscosity, measured in m-cresol (0.5 wt %, 20° C.) of $\eta_{rel}$ less than 2.3, composed of
($A_1$) dicarboxylic acids, containing
50-100 mol % terephthalic acid, based on the total amount of dicarboxylic acids present,
0-50 mol % of another aromatic dicarboxylic acid with 8 to 20 carbon atoms, based on the total amount of acids,
0-50 mol % of an aliphatic dicarboxylic acid with 6 to 36 carbon atoms,
0-50 mol % of a cycloaliphatic dicarboxylic acid with 8 to 20 carbon atoms,
($A_2$) diamines, containing
50-100 mol % of at least one diamine selected from the group consisting of 1,6-hexanediamine, 2-methyl-1,5-pentanediamine, 1,7-heptanediamine, 1,8-octanediamine, 1,11-undecanediamine, 1,12-dodecanediamine, MACM, PACM, 1,3-bis-(aminomethyl)-cyclohexane and MXDA, based on the total amount of diamines present,
0-50 mol % other aliphatic diamines with 6 to 18 carbon atoms,
0-50 mol % cycloaliphatic diamines with 6 to 20 carbon atoms,
0-50 mol % araliphatic diamines MXDA, PXDA,
and optionally ($A_3$) aminocarboxylic acids and/or lactams, containing
0-100 mol % lactams with 6 to 12 carbon atoms,
0-100 mol % aminocarboxylic acids with 6 to 12 carbon atoms,
wherein the components ($A_1$) and ($A_2$) are used approximately in equimolar amounts and the concentration of ($A_3$) does not exceed 35 wt % of the total of ($A_1$) through ($A_3$), and
wherein the reinforcing medium comprises
(B) 40 to 80 wt % of at least one filler, containing:
($B_1$) 20 to 80 wt %, optionally 40 to 80 wt %, flat glass fibers with an elongated shape, where the glass fibers have a noncircular cross-sectional area and a dimension ratio of the main cross-sectional axis to the secondary cross-sectional axis of 2 to 6, optionally 3 to 6, or optionally from 3.5 to 5.0,
($B_2$) 0-30 wt % particulate or stratified fillers,
($B_3$) 0-30 wt % carbon fibers and/or basalt fibers and/or aramid fibers (p- or m-aramid fibers),
($B_4$) 0-30 wt % glass fibers with a round cross section, and
(C) 0 to 20 wt % additives and auxiliary substances,
wherein the amount of components (A) through (C) in wt % yields 100% together.

The above object is achieved by a method for manufacturing the above specified polyamide molding compound on conventional compounding equipment at set barrel temperatures of 280° C. to 350° C., whereby the polymer component is first melted and then the chopped flat glass fibers and/or the other fillers are added.

The above object is achieved by a method of molding, optionally injection molding, comprising molding a molding compound to produce a molded article or part of a molded article, the improvement wherein said molding compound as specified above has a notched impact strength of more than 20 kJ/m$^2$ (measured according to Charpy at 23° C., according to ISO 179/2-1 eA).

The above object is achieved by injection molding, extrusion, pultrusion, blow-molding or by a molded body, optionally an injection-molded part formed from the molding compound as specified above.

Effects of the Invention

It has been found according to the invention that flat glass fibers, in particular those having a rectangular cross section, i.e., a noncircular cross section (ratio of cross-sectional axes $\geq 2$, especially $\geq 3$) in comparison with those having a circular cross section (e.g., conventional chopped glass fibers which usually have a circular cross section) have definite advantages in mechanical properties, in processing and in surface quality. This is true especially at high glass fiber contents of $\geq 50\%$.

BEST MODE FOR CARRYING OUT THE INVENTION

Hereafter, the present invention will be explained in detail.
When speaking of rectangular glass fibers below, this means that the cross section of the glass fibers is rectangular or almost rectangular or a rounded rectangle such that the long sides of the rectangle are aligned almost parallel to one another and the short sides of the rectangle are bent at the ends or are curved as a whole, whereby in the latter case the short sides are shaped like the segments of ellipses or circles. In comparison with the cocoon fibers, the cross section of the rectangular glass fibers does not have any constrictions.

Thus, according to the invention, the notched impact strength is almost twice as high when using flat glass fibers in PA6T/6I (70:30) molding compounds with 60 wt % glass fibers but otherwise the same recipe in comparison with the use of glass fibers having a circular geometry. These high-impact strength values are also obtained when a PA6T/6I (70:30) compound having a low molecular weight ($\eta_{rel}$=1.57) is used. A PA6T/6I (70:30) having a low molecular weight has a low melt viscosity and thus offers advantages in processing by injection molding.

Lower impact strength values are usually obtained with polyamides having a low molecular weight than with those having a higher molecular weight. At high degrees of filling, however, thermoplastic processing is difficult due to a greater viscosity of the higher molecular weight polyamides. This is manifested in difficulties in mold filling, pock marks and poor surface quality.

It has now been found according to the present invention that especially in the case of large amounts of flat glass fibers (50 wt % or more), products characterized by a good processability, low deformation, high surface quality and significantly higher impact strength can be produced with the inventive molding compounds, especially when using partially aromatic polyamides having a low viscosity, especially preferably with low viscosity PA6T/6I or PA6T/66 in comparison with materials containing glass fibers having a circular cross section.

In comparison with glass fibers having a circular cross section, glass fibers having a cross section whose main axis and secondary axis have different values (flat glass fibers) allow a noticeably higher packing density at high degrees of reinforcement, thereby resulting in higher modulus values, higher strength, in particular across the direction of the fiber.

The expected improvement with regard to stiffness and strength is then fully manifested, however, only when the spaces between the flat glass fibers, which tend to be smaller, are adequately infiltrated with polymer matrix and the matrix allows sufficient conduction of the forces that occur in deformation. Only the polyamides having a low viscosity that are used according to the present invention fully utilize the potential of the geometrically advantageous flat glass fibers.

Straight building parts which are under a compressive load during use, e.g., housings for pressure meters, valves or water meters, benefit from the increased stiffness and strength across the direction of alignment of the fibers because the burst pressure and dimensional stability are improved in this way. Due to the higher transverse stiffness of the building parts which are manufactured from the inventive molding compounds and are 10% to 40% higher than the level of the molding compounds containing glass fibers having a circular cross section, depending on the composition, there is much less resulting deformation of the building part under alternating compressive loads. This is of particular interest because molding compounds based on partially aromatic polyamides, in particular those containing mainly terephthalamide units (6T units) have a lower transverse stiffness in comparison with the longitudinal stiffness when reinforced with conventional glass fibers of a circular cross section. The much lower transverse strength in comparison with the longitudinal strength has an even greater effect in the design of molded parts. This deficiency can be compensated by using flat glass fibers in combination with low-viscosity polyamides because in this way not only are the individual values for the longitudinal and transverse stiffness as well as those for the longitudinal strength and transverse strength increased but also the ratio of the transverse stiffness to the longitudinal stiffness and the ratio of the transverse strength to the longitudinal strength are increased. The transverse stiffness and transverse strength are determined at a right angle to the processing direction and therefore also at a right angle to the direction of orientation of the glass fibers in the molded part.

The matrix of the polyamide molding compounds used according to the present invention is based on at least one high-melting polyamide (component (A)) which has a melting point of at least 270° C. and an HDT A of at least 260° C. (with a degree of reinforcement of at least 50 wt %).

The high-melting polyamide (component (A)) has a solution viscosity, measured in m-cresol (0.5 wt %, 20° C.) of $\eta_{rel}$ less than 2.3, preferably $\eta_{rel}$ less than 1.9, in particular $\eta_{rel}$ less than 1.8.

A high-melting polyamide that may be considered in particular is a polyamide based on aromatic dicarboxylic acids and aliphatic diamines. A portion of the aromatic dicarboxylic acids can be replaced by aliphatic and/or cycloaliphatic dicarboxylic acids, some of the aliphatic diamines may be replaced by cycloaliphatic and/or araliphatic diamines. The dicarboxylic acids and the diamines may also be partially replaced by lactams and/or aminocarboxylic acids.

Thus the high-melting polyamides are formed from the following components:

($A_1$) dicarboxylic acids:
  50-100 mol % terephthalic acid based on the total amount of acids present,
  0-50 mol % of another aromatic dicarboxylic acid with 8 to 20 carbon atoms and/or
  0-50 mol % of an aliphatic dicarboxylic acid with 6 to 36 carbon atoms and/or 0-50 mol % of a cycloaliphatic dicarboxylic acid with 8 to 20 carbon atoms.

($A_2$) diamines:
  50-100 mol % of at least one diamine selected from the group comprising 1,6-hexanediamine, 2-methyl-1,5-pentanediamine, 1,7-heptanediamine, 1,8-octanediamine, 1,11-undecanediamine, 1,12-dodecanediamine, MACM, PACM, 1,3-bis-(aminomethyl)-cyclohexane and MXDA, based on the total amount of diamines present,
  0-50 mol % other aliphatic diamines, and/or
  0-50 mol % other cycloaliphatic diamines with 6 to 20 carbon atoms, and/or
  0-50 mol % araliphatic diamines MXDA, PXDA,
  whereby in the high-melting polyamides the percentage molar content of dicarboxylic acids amounts to 100% and the percentage molar content of diamines amounts to 100%, and optionally from:

($A_3$) aminocarboxylic acids and/or lactams, containing
  0-100 mol % lactams with 6 to 12 carbon atoms, and/or
  0-100 mol % aminocarboxylic acids with 6 to 12 carbon atoms.

Although components ($A_1$) and ($A_2$) are used largely in equimolar amounts, the concentration of ($A_3$) amounts to at most 35 wt %, preferably at most 25 wt %, in particular at most 20 wt %, based on the total of ($A_1$) to ($A_3$).

In addition to the components $A_1$ and $A_2$ which are used in largely equimolar amounts, dicarboxylic acids ($A_1$) or diamines ($A_2$) may also be used to regulate the molecular weight or for compensating for monomer losses in synthesis of the polyamide so that in their totality the concentration of a component $A_1$ or $A_2$ may be predominant.

Some of the terephthalic acid (TPA) may be replaced by up to 50 mol %, preferably up to 48 mol % and in particular up to 46 mol % other aromatic, aliphatic or cycloaliphatic dicarboxylic acids with 6 to 36 carbon atoms (based on the total amount of dicarboxylic acids). The suitable aromatic dicarboxylic acids include naphthalenedicarboxylic acid (NDA) and isophthalic acid (IPA). Suitable aliphatic dicarboxylic acids include adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimeric acid. Suitable cycloaliphatic dicarboxylic acids include the cis- and/or trans-cyclohexane-1,4-dicarboxylic acid and/or cis- and/or trans-cyclohexane-1,3-dicarboxylic acid (CHDA).

The diamines used as component ($A_2$) in the amount of 50-100 mol % are selected from the group comprised of 1,6-hexanediamine, 2-methyl-1,5-pentanediamine, 1,7-heptanediamine, 1,8-octanediamine, 1,11-undecanediamine, 1,12-dodecanediamine, MACM, PACM, 1,3-bis-(aminomethyl)-cyclohexane and MXDA. Of these, the diamines 1,6-hexanediamine, 2-methyl-1,5-pentanediamine and 1,12-dodecanediamine are preferred, especially 1,6-hexanediamine.

The above-mentioned diamines that are obligatorily used may be replaced by other diamines having 4 to 36 carbon atoms in a subordinate amount of no more than 50 mol %, preferably no more than 40 mol % and in particular no more than 30 mol % (based on the total amount of diamines). Examples of linear or branched aliphatic diamines include 1,4-butanediamine, 1,5-pentanediamine, 1,6-hexanediamine, 1,7-heptanediamine, 1,8-octanediamine (OMDA), 1,9-nonanediamine (NMDA), 2-methyl-1,8-octanediamine (MODA), 2,2,4-trimethylhexa-methylenediamine (TMHMD), 2,4,4-trimethylhexamethylene-diamine (TMHMD), 5-methyl-1,9-nonanediamine, 1,10-decanediamine, 1,11-undecane-diamine, 2-butyl-2-ethyl-1,5-pentanediamine, 1,12-dodecanediamine, 1,13 tridecanediamine, 1,14-tetradecanediamine, 1,16-hexadecanediamine, and 1,18-octadecanediamine. Examples of cycloaliphatic diamines that may be used include cyclohexanediamine, 1,3-bis-(aminomethyl)-cyclohexane (BAC), isophoronediamine, norbornanedimethylamine, 4,4'-diaminodicyclohexylmethane (PACM), 2,2-(4,4'-diaminodicyclohexyl)propane (PACP) and 3,3'-dimethyl-4,4'-diaminodicyclohexyl-methane (MACM). An example of an araliphatic diamine would be m-xylylenediamine (MXDA).

In addition to the dicarboxylic acids and diamines described here, lactams and/or aminocarboxylic acids may also be used as the polyamide-forming components (component ($A_3$)). Suitable compounds include, for example, caprolactam (CL), ω-aminocaproic acid, ω-aminononanoic acid, ω-aminoundecanoic acid (AUA), lauryl lactam (LL) and ω-aminododecanoic acid (ADA). The concentration of the aminocarboxylic acids and/or lactams used together with components $A_1$ and $A_2$ is at most 35 wt %, preferably at most 25 wt % and especially preferably at most 20 wt %, based on the total of components $A_1$ and $A_2$. Especially preferred lactams include α,ω-amino acids having 4, 6, 7, 8, 11 or 12 carbon atoms. These include the lactams pyrrolidin-2-one (4 carbon atoms), ε-caprolactam (6 carbon atoms), enanthlactam (7 carbon atoms), capryl lactam (8 carbon atoms), lauryl lactam (12 carbon atoms) and/or the α,ω-amino acids 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid.

Since diamines are more volatile compounds than dicarboxylic acids, some diamine is lost in the synthesis process. Diamine is lost through evaporation of water, through discharge of the precondensate and through postcondensation in the melt or in the solid phase. To compensate for the loss of diamine, a diamine excess of 1 to 8 wt %, based on the total amount of diamines, is therefore preferably added to the monomer batch. With the diamine excess, the molecular weight and the distribution of end groups are also regulated. With the method according to the examples as used here, a carboxyl end group excess of 10 to 150 mmol/kg occurs with a diamine excess of less than 3%. When the diamine excess is greater than 3%, the amino end group excess amounts to 10 to 150 mmol/kg.

To regulate the molecular weight, the relative viscosity and/or the flowability or the MVR, regulators in the form of monocarboxylic acids or monoamines may be added to the batch and/or to the precondensate (before the postcondensation). Aliphatic, cycloaliphatic or aromatic monocarboxylic acids or monoamines suitable as regulators include acetic acid, propionic acid, butyric acid, valeric acid, caproic acid, lauric acid, stearic acid, 2-ethyl-hexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, etc. The regulators may be used individually or in combination. Other monofunctional compounds may also be used as regulators if they are capable of reacting with an amino group or an acid group, such as anhydrides, isocyanates, acid halides or esters. The usual amount of regulator to use is between 10 and 200 mmol per kg polymer.

The partially aromatic copolyamides (A) can be synthesized by known methods. Suitable methods have been described in various locations and some of the possible methods discussed in the patent literature will be given below and the disclosure content of the documents listed below is explicitly included in the disclosure content of the present patent application with regard to the process for synthesizing the copolyamide of component (A) of the present invention: DE 195 13 940, EP 0 976 774, EP 0 129 195, EP 0 129 196, EP 0 299 444, U.S. Pat. No. 4,831,106, U.S. Pat. No. 4,607,073, DE 14 95 393 and U.S. Pat. No. 3,454,536.

The most common method which is also the most suitable for synthesis of component (A) is the two-step synthesis of first a low viscosity, low molecular weight precondensate and then postcondensation in the solid phase or in the melt (e.g., in the extruder). A three-step process of 1. precondensation, 2. solid-phase polymerization and 3. melt polymerization is also possible as described in DE 696 30 260.

For products with melting points below 300° C., the one-step batch process described, for example, in U.S. Pat. No. 3,843,611 and U.S. Pat. No. 3,839,296 in which the mixture of monomers or their salts is heated to temperatures of 250-320° C. for 1 to 16 hours and the pressure is reduced from a maximum with evaporation of gaseous material, optionally with the help of an inert gas, to the lowest pressure of up to 1 mmHg.

According to the present invention, the following partially aromatic copolyamides are especially preferred as high-melting polyamides (A):

partially crystalline polyamide synthesized from at least 50 mol % terephthalic acid and hexamethylenediamine, as single diamine component;

partially crystalline polyamide synthesized from at least 52 mol % terephthalic acid and hexamethylenediamine;

partially crystalline polyamide synthesized from at least 54 mol % terephthalic acid and hexamethylenediamine;

partially crystalline polyamide synthesized from at least 62 mol % terephthalic acid and hexamethylenediamine;

partially crystalline polyamide, synthesized from at least 50 mol % terephthalic acid and 2-methyl-1,5-pentanediamine;

partially crystalline polyamide, synthesized from at least 50 mol % terephthalic acid and a mixture of hexamethylenediamine and 2-methyl-1,5-pentanediamine;

partially crystalline polyamide, synthesized from at least 50 mol % terephthalic acid and a mixture of at least two diamines selected from the group hexamethylene-diamine, nonanediamine, methyloctanediamine, and decanediamine, whereby at least 50 mol % hexamethylenediamine, based on the total diamine content, is used;

partially crystalline polyamide, synthesized from at least 50 mol % terephthalic acid and a mixture of hexamethylenediamine and dodecanediamine, whereby at least 50 mol % hexamethylenediamine, based on the total diamine content, is used;

partially crystalline polyamide, synthesized from at least 50 mol % terephthalic acid and a mixture of hexamethylenediamine and trimethylhexamethylenediamine, whereby at least 50 mol % hexamethylenediamine, based on the total diamine content, is used;

partially crystalline polyamide, synthesized from at least 50 mol % terephthalic acid and a mixture of hexamethylenediamine and m-xylylenediamine, whereby at least 50 mol % hexamethylenediamine, based on the total diamine content, is used;

partially crystalline polyamide, synthesized from at least 50 mol % terephthalic acid and a mixture of hexamethylenediamine and bis-(4-aminocyclohexyl)-methane, whereby at least 50 mol % hexamethylenediamine, based on the total diamine content, is used;

partially crystalline polyamide, synthesized from at least 50 mol % terephthalic acid and a mixture of hexamethylenediamine and bis-(4-amino-3-methyl-cyclohexyl)-methane, whereby at least 50 mol % hexamethylenediamine, based on the total diamine content, is used;

partially crystalline polyamide 6T/6I with 50 to 80 mol % hexamethyleneterephthal-amide units and 20 to 50 mol % hexamethyleneisophthalamide units;

partially crystalline polyamide 6T/6I with 55 to 75 mol % hexamethyleneterephthal-amide units and 25 to 45 mol % hexamethyleneisophthalamide units;

partially crystalline polyamide 6T/6I with 62 to 73 mol % hexamethyleneterephthal-amide units and 25 to 38 mol % hexamethyleneisophthalamide units;

partially crystalline polyamide 6T/6I with 70 mol % hexamethyleneterephthalamide units and 30 mol % hexamethyleneisophthalamide units;

partially crystalline polyamide 6T/66 with 50 to 80 mol % hexamethyleneterephthal-amide units and 20 to 50 mol % hexamethyleneadipamide (66) units;

partially crystalline polyamide 6T/66 with 50 to 65 mol % hexamethylene-terephthal-amide units and 35 to 50 mol % hexamethyleneadipamide (66) units;

partially crystalline polyamide 6T/66 with 52 to 62 mol % hexamethylene-terephthal-amide units and 38 to 48 mol % hexamethyleneadipamide (66) units;

partially crystalline polyamide 6T/66 with 55 mol % hexamethyleneterephthalamide units and 45 mol % hexamethyleneadipamide (66) units;

partially crystalline ternary polyamide 6T/6I/66 with 50 to 70 mol % hexamethylene-terephthalamide units and 5 to 45 mol % hexamethyleneisophthalamide units and 5 to 45 mol % hexamethyleneadipamide (66) units;

partially crystalline PA 6T/6I/X with at least 50 mol % hexamethyleneterephthalamide units and 0 to 40 mol % hexamethyleneisophthalamide units and 10 mol % to 50 mol % aliphatic units of the formula $NH-(CH_2)_{n-1}-CO$, where n is 6, 11 or 12;

partially crystalline PA 6T/6I/X with at least 50 mol % hexamethyleneterephthalamide units and 10 mol % to 30 mol % hexamethyleneisophthalamide units and 10 mol % to 40 mol % aliphatic units of the formula $NH-(CH_2)_{n-1}-CO$, where n is 6, 11 or 12;

partially crystalline ternary PA 6T/6I/X with 52 mol % to 73 mol % hexamethylene-terephthalamide units and 0 to 36 mol % hexamethyleneisophthalamide units and 12 to 48 mol % aliphatic units of the formula $NH-(CH_2)_{n-1}-CO$, where n is 6, 11 or 12;

partially crystalline PA 6T/6I/X with 52 mol % to 73 mol % hexamethyleneterephthal-amide units and 10 to 36 mol % hexamethyleneisophthalamide units and 12 mol % to 38 mol % aliphatic units of the formula $NH-(CH_2)_{n-1}-CO$, where n is 6, 11 or 12;

mixtures of amorphous polyamide 6T/6I with at most 40 mol % hexamethylene-terephthalamide units and at least 60 mol % hexamethyleneisophthalamide units and an excess of partially crystalline polyamide 6T/6I or 6T/66 with at least 52 mol % hexamethyleneterephthalamide units;

partially aromatic and partially crystalline polyamide, containing up to 26 mol % aliphatic units that can be synthesized by condensation of dimerized fatty acids with up to 44 carbon atoms and an aliphatic or a cycloaliphatic diamine, in particular with hexamethylenediamine.

In particular, specific representatives of the inventive polyamides are as follows:

PA 6T/6I, PA 6T/66, PA 6T/610, PA 6T/612, PA 6T/12, PA 6T/11, PA 6T/6, PA 6T/10T, PA 6T/10I, PA 6T/106, PA 6T/1010, PA 6T/66/106, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPT/MPI, PA MPT/MP6, PA 6T/MPI, PA 6T/9T, PA 6T/12T, PA 6T/6I/66, PA 6T/6I/6, PA 6T/6I/12, PA 6T/66/6, PA 6T/66/12, PA 6T/6I/MACMI, PA 6T/66/PACM6.

In a first embodiment, the flat glass fibers (component (B1)) used according to the present invention are short glass fibers with a flat shape and a noncircular cross-sectional area, whereby the ratio of the cross-sectional axes perpendicular to one another is greater than or equal to 2, in particular greater than or equal to 3, and the smaller cross-sectional axis has a length of $\geq 3$ μm. In particular, a glass fiber that has a cross section as close to rectangular as possible is preferred, with the ratio of the cross-sectional axes being greater than 3, in particular greater than or equal to 3.5. The glass fibers are in the form of chopped glass with a length of 2 mm to 50 mm. The glass fiber concentration in the inventive molding compounds is between 20 wt % and 80 wt %, preferably between 40 wt % and 80 wt %, especially preferably between 48 wt % and 75 wt %, most especially preferably between 48 wt % and 65 wt % and in a special embodiment of the invention the glass fibers are always present in amounts of at least 60 wt %.

In a second embodiment, the flat glass fibers used according to the invention are long glass fibers with a flat shape and a noncircular cross-sectional area, whereby the ratio of the cross-sectional axes perpendicular to one another is greater than or equal to 2, in particular greater than or equal to 3, and the smaller cross-sectional axis has a length of $\geq 3$ μm. In particular a long glass fiber having the most rectangular possible cross section is preferred, in which the ratio of the cross-sectional axes greater than 3, in particular greater than or equal to 3.5. The glass fibers used as roving (component $B_1$) according to the invention have a diameter (small cross-sectional axis of 3 μm to 20 μm, preferably 3 μm to 10 μm). So-called flat glass fibers with a ratio of the cross-sectional axes of 3.5 to 5.0 are especially preferred. In particular E-glass fibers are used according to the invention. In addition to the preferred E-glass fibers, S-glass fibers are also used in particular because they have a 30% higher tensile strength in comparison with the E-glass fibers. However, all other types of glass fibers such as A, C, D, M, R glass fibers or any mixtures thereof or mixtures with E- and/or S-glass fibers may also be used.

In an alternative embodiment of the invention, only flat glass fibers having an elongated shape and an almost rectangular cross section are used, the aspect ratio, i.e., the ratio of dimensions of the main axis/cross-sectional axis to the secondary/cross-sectional axis is 2 to 6, in particular 3 to 6, most especially preferably from 3.5 to 5.0. Cocoon-shaped glass fibers or so-called glass fiber cocoons (cocoon fibers), i.e., glass fibers having an elongated or oval shape or a curved shape with at least one constricted section are not used in this embodiment.

In another alternative inventive embodiment, the flat glass fibers used according to the invention are used in combination with carbon fibers (graphite fibers). By replacing some of the glass fibers with carbon fibers, the result is thus a hybrid fiber-reinforced compound whose stiffness is improved in comparison with pure glass fibers. The mixture of glass fibers and carbon fibers may have a weight ratio of glass fibers to carbon fibers of 70/30 to 97/3, in particular 80/20 to 95/5.

The inventive polyamide molding compounds can be produced by the known methods of producing long fiber-reinforced rod granules, in particular by pultrusion methods in which a continuous fiber strand (roving) is completely impregnated with the polymer melt and then cooled and chopped.

The long fiber-reinforced rod granules obtained in this way, preferably having a granule length of 3 mm to 25 mm, in particular 4 mm to 12 mm, can be processed further to molded parts by the conventional processing methods (e.g., injection molding, pressing), whereby especially good properties of the molded part are achieved with gentle processing methods. In this context, gentle means in particular that excess fiber breakage and the associated great reduction in fiber length are largely avoided. In injection molding, this means that worm gears with a large diameter and a low compression ratio, in particular less than 2, and generously dimensioned nozzle channels and sprue channels are preferred for use here. In addition, steps should be taken to ensure that the rod granules will melt rapidly with the help of high barrel temperatures (contact heating) and that the fibers will not be reduced too much in size due to excessive shear stress. Taking into account these measures, molded parts having on the average a greater fiber length than comparable molded parts produced from short-fiber-reinforced molding compounds are obtained. In this way, an additional improvement in properties is achieved, in particular in the modulus of elasticity, the tensile strength and the notched impact strength.

The continuous carbon fibers used in the pultrusion method have a diameter of 5 μm to 10 μm, preferably 6 μm to 8 μm.

To accelerate the fiber impregnation, the fibers may be preheated to temperatures up to 400° C. with the help of a suitable IR preheating, contact preheating, radiant preheating or hot gas preheating. Devices with expanding surfaces within the impregnation chamber ensure complete impregnation of the fibers with the polymer melt. Strands emerging from the impregnation unit can be shaped through controlled roller systems so that granules with a circular, elliptical or rectangular cross section are obtained.

To improve the matrix binding and fiber handling, the fibers may be coated with chemically different layers such as those known for glass fibers and carbon fibers in the state of the art.

It has surprisingly been possible according to this invention to achieve, even when using chopped glass, high notched impact strength values which are otherwise obtained only with long fiber reinforcement and polyamides with a high molecular weight. According to this invention, high notched impact strength values are obtained with high reinforcement values in particular: notched impact strength values greater than 20 kJ/m$^2$ are obtained with a glass fiber content of 50 wt % to 60 wt %, notched impact strength values greater than 23 kJ/m$^2$ are obtained with a glass fiber content of more than 60 wt %.

In addition, high flow lengths are achieved according to this invention, in particular with the thin-walled parts (injection molding) produced from the molding compounds: flow lengths of >120 mm with degrees of reinforcement of ≦65 wt %. With the additional use of internal and/or external lubricants, however, significantly higher flow lengths can easily be achieved, as shown by Example 11.

Optionally other fillers and reinforcing materials may also be added to the molding compounds (components $B_2$ through $B_4$) may also be added in amounts of 0 to 30 wt %. As preferred additional reinforcing materials, examples include carbon fibers (graphite fibers), boron fibers, aramid fibers (p- or m-aramid fibers (e.g., Kevlar® or Nomex®, DuPont) or mixtures thereof) and basalt fibers and glass fibers with a round cross section or mixtures thereof may also be mentioned, where these reinforcing fibers may be used as short fibers or long fibers are also in the form of a mixture of different fibers.

The inventive thermoplastic molding compounds according to the invention may preferably contain as component ($B_2$) a particulate filler or a mixture of two or more different fillers even in combination with reinforcing materials. For example, mineral particulate fillers based on talc, mica, silicate, quartz, titanium dioxide, wollastonite, kaolin, amorphous silicic acids, magnesium carbonate, magnesium hydroxide, chalk, lime, feldspar, barium sulfate, solid or hollow glass beads or ground glass, in particular ground flat glass fibers, permanently magnetic and/or magnetizable metal compounds and/or alloys may be used. The fillers may also be surface treated.

However, the inventive molding compounds may also contain other additives (C), e.g., from the group of inorganic stabilizers such as copper halides, organic stabilizers, lubricants, dyes, nucleating agents, metallic pigments, metal flakes, metal-coated particles, halogenated flame retardants, halogen-free flame retardants, impact modifiers, other polymers such as polyphenylene oxide, polyphenylene sulfide, antistatics, conductivity additives, mold release aids, optical brighteners, natural phyllosilicates, synthetic phyllosilicates or mixtures of the aforementioned additives.

Certain additives a negative influence on the flowability of the molding compounds and thus their processing to molded parts, so the composition of the molding compounds rapidly reaches its limits with regard to the degree of reinforcement. By using the flat glass fibers, in particular glass fibers with an almost rectangular cross section, however, the flowability of flame-protected molding compounds, for example, can be adjusted satisfactorily even at high degrees of reinforcement. For example, PA 6T/6I molding compounds with a flame-retardant finish using, for example, phosphinic acid salts and/or diphosphinic acid salts, in particular the aluminum and calcium phosphinates and optionally melamine polyphosphate (fire classification according to UL-94: V0 with a test body 0.8 mm thick) can still be processed well even with degrees of reinforcement of 50 wt % to 60 wt % and have a good surface. The concentration of the flame retardant is preferably in the range of 10 wt % to 18 wt %, in particular in the range of 11 wt % to 15 wt %, based on the reinforced polyamide molding compound. In particular the flame retardant is composed of a mixture of 8.0-17.8 wt % aluminum, zinc and/or calcium phosphinate and/or diphosphonate and 0.2-10.0 wt % melamine polyphosphate.

For example, carbon black and/or carbon nanotubes may be used as antistatic agents in the inventive molding compounds.

However, the use of carbon black in addition to the carbon fibers that are present may also serve to improve the black coloration of the molding compound.

The phyllosilicates used in the inventive molding compounds may include, for example, kaolins, serpentines, talc, mica, vermiculite, illite, smectite, montmorillonite, hectorite, double hydroxides or mixtures thereof. The phyllosilicates may be surface-treated or untreated.

Stabilizers and/or antiaging agents used in the inventive molding compounds may include, for example, antioxidants, light protectants, UV stabilizers, UV absorbers or UV blockers.

As already explained above, the flat glass fibers ($B_1$) are also used according to this invention as chopped glass (short glass fibers) or alternatively as rovings (continuous fibers or long glass fibers). These glass fibers have diameters of the small cross-sectional axis of 3 μm to 20 μm and a diameter of the large cross-sectional axis of 6 µm to 40 µm, where the ratio of the cross-sectional axes perpendicular to one another is in the range of 2 to 6, in particular 3 to 6, most especially preferably from 3.5 to 5.0. In particular, E- and/or S-glass fibers are used according to the invention. However, all other types of glass fibers, e.g., A-, C-, D-, M- and R-glass fibers or any mixtures thereof or mixtures with E- and/or S-glass fibers may also be used. The conventional sizings customarily used for polyamide such as various aminosilane sizings are used, but sizings that are stable at high temperatures are preferred.

The inventive polyamide molding compounds can be produced on conventional compounding machines such as a single-screw or twin-screw extruder or screw kneader. As a rule, first the polymer component is melted and the reinforcing material (glass fibers and/or carbon fibers) can be introduced at the same location or at different locations in the extruder, e.g., by means of a side feeder. The compounding is preferably performed at set barrel temperatures of 280° C. to 360° C. With gentle processing of the inventive molding compounds, reinforced molded parts in which the fiber length distribution is definitely shifted toward greater fiber lengths are obtained. Thus the inventive molded parts have a higher average fiber length by 20 to 200% on the average in comparison with molded parts based on glass fibers having a round cross section.

The molded articles produced from the inventive molding compounds are used for production of interior and exterior parts, preferably with a load-bearing or mechanical function in the field of electronics, furniture, sports, machine construction, plumbing and hygiene, medicine, energy and drive technology, automotive and other transport means or housing materials for devices and appliances for telecommunications, entertainment electronics, household appliances, mechanical engineering, heating or as fastening parts for installations or for containers and ventilation parts of all types.

As possible applications for the molded articles produced from the inventive molding compounds, the field of metal compression casting replacements can be mentioned in particular, where an extremely high stiffness is expected in combination with a good impact strength.

Applications

Electric Device Field
- Stopping elements and/or adjusting elements for handheld electric tools with or without integrated electric functions (molded interconnect devices, MID)
- Tie rods and/or pistons for pneumatic drills in a homogeneous design, i.e., made of one material or as a hybrid part, i.e., a combination of materials
- Housings, gear housings for angle grinders, drilling machines, electric planing machines or grinding machines with or without integrated electric function (MID) in a homogeneous design or as a hybrid part, whereby certain function areas (e.g., force transmission surfaces, sliding surfaces, visible decorative areas, handle area) may be made of another compatible or incompatible material (e.g., for targeted delamination and/or deformation, intended breaking points, force and/or torque limitation).
- Tool receptacles, e.g., chucks and/or securing means
- Sewing machine housings, sliding tables with or without integrated electric function (MID)
- Housings or housing parts for telecommunications (e.g., cellular telephones), office electronic equipment (laptop casings and projector housings) and entertainment electronic devices Plumbing and Hygiene Field
- Housings and/or function elements (e.g., for pumps, gears, valves) for mouth washing, tooth brushing, camping toilets, shower cells, hygiene centers with or without integrated electric functions (MID) in a homogeneous design or as a hybrid part
- Various connectors or connecting modules
- Pump housings, valve housings or water meter housings with or without integrated electric functions (MID) in a homogeneous design or as a hybrid part.

Household Appliance Field
- Housings and/or function elements for mechanical, electric or electromechanical closing systems, locking systems or sensors with or without integrated electric functions (MID) for
  - refrigerators, freezers, chest freezers
  - baking ovens, kitchen stoves, steam cookers
  - dishwashing machines Automotive Field
- Housings and/or mounts with or without integrated electric functions (MID) in a homogeneous design or as a hybrid part for
  - operating elements/switches (e.g., for exterior mirror adjustment, seat position adjustment, lighting, direction of travel indicator)
  - interior sensors, e.g., for seat occupancy
  - exterior sensors (e.g., for parking assistance, distance meter with ultrasound and/or radar)
  - sensors in the engine compartment (e.g., vibration sensors and/or knocking sensors)
  - interior and exterior lighting
  - motors and/or drive elements in the interior and exterior area (e.g., for seat comfort functions, exterior rear mirror adjustment, main headlight adjustment and/or readjustment, turn indicator lights)
  - regulating and/or control systems for the vehicle drive (e.g., for media guidance and/or regulation of fuel, air, coolant, lubricant)
- Mechanical function elements and/or sensor housings with or without integrated electric functions (MID) for
  - closing systems, locking systems, towing systems, e.g., with automotive swivel doors, sliding doors, engine compartment valves and/or hoods, trunk lids, vehicle windows
  - connectors for fluid lines, connectors in the area of the automotive electric and electronic systems.

Mechanical Engineering Field
- ISO standard parts and/or machine elements (e.g., screws, nuts, bolts, wedges, shafts, gear wheels) in standard dimensions or in application-specific design or homogeneous embodiment
- ISO standard parts and/or machine elements, e.g., screws, nuts, bolts, wedges, shafts in standard dimensions or application-specific design or as a hybrid part, whereby certain function areas, e.g., force transmission surfaces, sliding surfaces, decorative inspection areas may be made of another compatible or incompatible material (e.g., for targeted delamination, intended breaking point, force/torque limiting).
- Stands, feet, bases for machining equipment such as standing drill machines, tabletop drill machines, milling machines or combinations for metal working and/or woodworking Insert parts, e.g., threaded bushings
Self-cutting screws
Energy and Drive Technology Field:
  Frames, housings, supporting parts (substrate) and/or fastening elements for solar cells with or without integrated electric functions (MID) in a homogeneous design or as a hybrid part.
  Adjusting and/or readjusting elements (e.g., for bearings, hinges, joints, tow bars, bumpers) for collectors.
  Pump housings and/or valve housings with or without integrated electric functions (MID) in a homogeneous design or as a hybrid part.
Medical Equipment Field
  Frames, housings, carrier parts with or without integrated electric functions (MID) in a homogeneous design or as a hybrid part for monitoring devices and/or equipment for supporting vital functions.
  Disposable equipment such as scissors, clamps, forceps, knife handles in a homogeneous design or as a hybrid part
  Constructions for short-term or emergency stabilization of fractures in a homogeneous design or as a hybrid part
  Walkers with or without integrated electric functions (MID) and/or sensors for load monitoring in a homogeneous design or as a hybrid part.

The following examples and figures are presented to illustrate the invention but without restricting it.

EXAMPLES

The materials listed below were used in the examples:
PA type A: polyamide 6T/6I (70:30) with $M_n$ of approx. 11,000 g/mol ($\eta_{rel}$=1.57), EMS-CHEMIE AG, Switzerland
PA type A-VK: polyamide 6T/6I (70:30) with $M_n$ of approx. 1,000 g/mol ($\eta_{rel}$=1.12), EMS-CHEMIE AG, Switzerland
PA type B: polyamide 6T/66 (60:40) with $\eta_{rel}$=1.67, EMS-CHEMIE AG, Switzerland
Glass fibers type A: NITTOBO CSG3PA-820, 3 mm long, 28 µm wide, 7 µm thick, aspect ratio of cross-sectional axes=4, aminosilane sizing, NITTO BOSEKI, Japan (flat glass fibers, according to the invention)
Glass fibers type B: NITTOBO CSH3PA-870, 3 mm long, 20 µm wide, 10 µm thick, aspect ratio of cross-sectional axes=2, aminosilane sizing, NITTO BOSEKI, Japan (flat glass fibers, cocoon-shaped, according to the invention)
Glass fibers type C: CS 7928, 4.5 mm long, 10 µm diameter, BAYER AG, Germany (glass fibers with a circular cross section, state of the art)
Melapur®200/70: a melamine polyphosphate (Ciba Spez. GmbH), flame retardant, CAS No.: 218768-84-4
Exolit®GP1230: an organophosphorus salt (Clariant Produkte GmbH), flame retardant The molding compounds of the compositions in Tables 1 to 3 were produced on a twin-screw extruder from the company Werner & Pfleiderer model ZSK 30. The granules PA6T/6I, PA6T/66 and the additives were dosed into the intake zone. The glass fibers were dosed into the polymer melt through a side feeder three housing units upstream from the nozzle.

The housing temperature was adjusted as an ascending profile up to 350° C. A throughput of 10 kg was achieved at 150 rpm to 200 rpm. Granulation was performed by means of underwater granulation and/or hot cast-off underwater, in which the polymer melt is forced through a perforated nozzle and granulated in a stream of water by cutting with a rotating blade immediately after leaving the nozzle. After granulating and drying at 110° C. for 24 hours, the properties of the granules were measured and the test bodies were produced.

The test bodies were manufactured on an Arburg injection molding system, with the barrel temperatures set at 300° C. to 350° C. and a circumferential screw speed of 15 m/min was set. The selected mold temperature was set at 100-140° C.

The measurements were performed according to the following standards and using the following test objects.
Modulus of Elasticity:
  ISO 527 with a traction speed of 1 mm/min
  ISO tension rod, standard: ISO/CD 3167, type A1, 170×20/10×4 mm, temperature 23° C.
Tensile Strength and Tensile Elongation:
  ISO 527 with a traction speed of 5 mm/min
  ISO tension rod, standard: ISO/CD 3167, type A1, 170×20/10×4 mm, temperature 23° C.
Impact Strength According to Charpy:
  ISO 179/*eU
  ISO test rod, standard: ISO/CD 3167, type B1, 80×10×4 mm, temperature 23° C.
  *1=not instrumented, 2=instrumented
Notched Impact Strength According to Charpy:
  ISO 179/*eA
  ISO test rod, standard: ISO/CD 3167, type B1, 80×10×4 mm, temperature 23° C.
  *1=not instrumented, 2=instrumented
Glass Transition Temperature (Tg), Enthalpy of Melting (ΔH)
  ISO standard 11357-1/-2
  Granules
  Differential scanning calorimetry (DSC) was performed with a heating rate of 20° C./min.
Relative Viscosity:
  DIN EN ISO 307, in 0.5 wt % m-cresol solution, temperature 20° C.
MVR: (Melt Volume Rate)
  According to ISO 1133 at 330 or 340° C. and with a load of 21.6 kg
Flow Length:
  The flow lengths were determined using an Arburg injection molding machine (type: ARBURG-ALLROUNDER 320-210-750). Flow spirals with the dimensions 1.5 mm×10 mm were prepared at a melt temperature of 330-340° C. and a mold temperature of 120-130° C.
Shrinkage:
  Shrinkage was determined in processing by injection molding according to ISO 294-4 on the basis of a plate with the dimensions 60×60×2 mm (shrinkage plate). The shrinkage plates were produced at barrel temperatures of 320 to 340° C., a dwell pressure of 600 bar and a mold temperature of 160° C. on a Ferromatik Milacron K85D-S/2F injection molding machine.
Burst Pressure:
  A cylindrical injection-molded body, sealed at one end (inside diameter 27.2 mm; wall thickness 4 mm) is filled with water, mounted in a burst pressure test stand by means of a quick-action hydraulic coupling and subjected to a burst pressure test (short-term internal pressure load until failure) at a rate of pressure increase of 10 bar/s. The maximum pressure reached is given in the tables.

Unless otherwise noted in the table, the test objects were used in a dry state. To do so, the test objects were stored in a dry environment for at least 48 hours at room temperature after being produced by injection molding.

TABLE 1

Examples 1 to 5 and Comparative Example 1 (VB1)

| | | Example | | | | | |
|---|---|---|---|---|---|---|---|
| | | 1 | 2 | 3 | 4 | 5 | VB1 |
| Composition | | | | | | | |
| PA type A | wt % | 50 | 40 | 35 | 30 | 40 | 40 |
| PA type B | | 0 | 0 | 0 | 0 | 0 | 0 |
| Glass fibers type A | wt % | 50 | 60 | 65 | 70 | 0 | 0 |
| Glass fibers type B | wt % | 0 | 0 | 0 | 0 | 60 | 0 |
| Glass fibers type C | wt % | 0 | 0 | 0 | 0 | 0 | 60 |
| Properties | | | | | | | |
| MVR (340° C./21.6 kg) | cm$^3$/10 min | 215 | 205 | 165 | 135 | 170 | 160 |
| Glass fiber content | wt % | 50.3 | 60.2 | 65.2 | 69.8 | 60.1 | 60.3 |
| HDT A (1.8 MPa) | ° C. | >280 | >280 | >280 | >280 | >280 | >280 |
| HDT C (8 Mpa) | ° C. | 222 | 253 | 260 | 267 | 222 | 212 |
| Modulus of elasticity | MPa | 17800 | 22100 | 25000 | 28000 | 21900 | 21800 |
| Modulus of elasticity longitudinal[1] | MPa | 19600 | 23900 | 27300 | 29700 | 23900 | 24000 |
| Modulus of elasticity transverse[1] | MPa | 13000 | 16200 | 16900 | 17900 | 13400 | 11700 |
| Ratio of modulus of elasticity transverse/longitudinal tensile strength | | 0.60 | 0.68 | 0.62 | 0.60 | 0.56 | 0.49 |
| Tensile strength | MPa | 242 | 268 | 273 | 289 | 245 | 230 |
| Tensile strength longitudinal[1] | MPa | 211 | 241 | 251 | 247 | 230 | 224 |
| Tensile strength transverse[1] | MPa | 95 | 99 | 107 | 106 | 80 | 66 |
| Ratio of transverse/longitudinal tensile strength | | 0.45 | 0.41 | 0.43 | 0.43 | 0.34 | 0.29 |
| Tensile elongation | % | 1.6 | 1.4 | 1.3 | 1.0 | 1.3 | 1.2 |
| Impact strength Charpy, 23° C. | kJ/m$^2$ | 75 | 71 | 74 | 73 | 65 | 63 |
| Notched impact strength Charpy, 23° C. | kJ/m$^2$ | 20 | 22 | 24 | 25 | 16 | 12 |
| Shrinkage transverse | % | 0.19 | 0.16 | 0.15 | 0.20 | 0.28 | 0.39 |
| Shrinkage longitudinal | % | 0.5 | 0.45 | 0.42 | 0.42 | 0.60 | 0.81 |
| Flow length (340° C./130° C.) | mm | 160 | 150 | 145 | 135 | 145 | 140 |
| Burst pressure | bar | n.b. | 300 | n.b. | n.b. | n.b. | 250 |

[1]Tensile test performed on Biax test object
n.b. = not determine

In comparison with the molding compound using round glass fibers (VB1), the inventive molding compound (B$_2$) based on PA6T/6I has a 39% higher transverse stiffness and a 50% higher transverse strength. In comparison with the molding compound with round glass fibers (VB2), the inventive molding compound (B7) based on PA6T/66 has a 34% higher transverse stiffness and a 51% higher transverse strength. The inventive molding compounds based on PA6T/6I (B$_2$) and PA6T/66 (B7) exceed by 25% to 35% the transverse stiffness and/or transverse strength of the molding compounds produced with cocoon-shaped glass fibers according to experiments 5 and 10. The high deflection temperature (HDT C) of the molding compounds reinforced with 60 wt % of the flat glass fibers having an aspect ratio of 4.0 (Example 2) is 30° C. higher than that of the conventional molding compound (VB1). Thus molding compounds reinforced with round glass fibers do not achieve the performance level of the inventive molding compounds.

TABLE 2

Examples 6 through 10 and Comparative Example 2 (VB2)

| | | Example | | | | | |
|---|---|---|---|---|---|---|---|
| | | 6 | 7 | 8 | 9 | 10 | VB2 |
| Composition | | | | | | | |
| PA type A | wt % | 0 | 0 | 0 | 0 | 0 | 0 |
| PA type B | | 50 | 40 | 35 | 30 | 40 | 40 |
| Glass fibers type A | wt % | 50 | 60 | 65 | 70 | 0 | 0 |

TABLE 2-continued

Examples 6 through 10 and Comparative Example 2 (VB2)

| | | Example | | | | | |
|---|---|---|---|---|---|---|---|
| | | 6 | 7 | 8 | 9 | 10 | VB2 |
| Glass fibers type B | wt % | 0 | 0 | 0 | 0 | 60 | 0 |
| Glass fibers type C | wt % | 0 | 0 | 0 | 0 | 0 | 60 |
| Properties | | | | | | | |
| MVR (330° C./21.6 kg) | cm³/10 min | 105 | 90 | 70 | 45 | 80 | 75 |
| Glass fiber content | wt % | 50.0 | 59.7 | 65.1 | 69.5 | 60.3 | 60.1 |
| Modulus of elasticity | Mpa | 18400 | 23300 | 25600 | 28000 | 22800 | 22600 |
| Modulus of elasticity longitudinal[1] | Mpa | 17700 | 22400 | 23800 | 27200 | 21900 | 21600 |
| Modulus of elasticity transverse[1] | Mpa | 10600 | 13700 | 14900 | 15100 | 11500 | 10200 |
| Ratio of modulus of elasticity transverse/longitudinal | | 0.60 | 0.61 | 0.63 | 0.56 | 0.53 | 0.47 |
| Tensile strength | Mpa | 249 | 260 | 262 | 255 | 255 | 251 |
| Tensile strength longitudinal[1] | Mpa | 200 | 215 | 207 | 210 | 195 | 181 |
| Tensile strength transverse[1] | Mpa | 97 | 100 | 96 | 89 | 80 | 66 |
| Ratio of tensile strength transverse/longitudinal | | 0.49 | 0.47 | 0.46 | 0.42 | 0.41 | 0.33 |
| Tensile elongation | % | 1.9 | 1.6 | 1.4 | 1.2 | 1.5 | 1.8 |
| Impact strength Charpy, 23° C. | kJ/m² | 75 | 76 | 79 | 70 | 70 | 66 |
| Notched impact strength Charpy, 23° C. | kJ/m² | 20 | 23 | 24 | 25 | 15 | 11 |
| Shrinkage transverse | % | 0.20 | 0.20 | 0.21 | 0.38 | 0.40 | 0.50 |
| Shrinkage longitudinal | % | 0.63 | 0.59 | 0.55 | 0.51 | 0.65 | 0.89 |
| Flow length (330° C./120° C.) | mm | 158 | 134 | 123 | 105 | 120 | 110 |
| Burst pressure | bar | n.b. | 430 | n.b. | n.b. | n.b. | 380 |

[1] Tensile test performed on Biax test bodies
n.b. = not determined

Special test bodies (BIAX, published in Noss'Ovra Personal Journal, December 2006, no. 12, vol. 29. EMS-CHEMIE AG) were used for the tensile test; these test bodies allow measurement of the stiffness and strength in correlation with direction.

It is found from the comparison with 60 wt % reinforced molding compounds that by combining (oriented) flat glass fibers with the inventive low-viscosity polyamide molding compound, the transverse stiffness can be improved by more than 30% and the transverse strength by 50%.

After incineration of the test objects, the length distribution of the glass fibers and the average fiber length were determined. The inventive molding bodies contained glass fibers which definitely had a greater fiber length.

In the production of the test bodies by injection molding, another advantage of the inventive molding compounds was noticed, namely the definitely reduced filling pressure in comparison with conventional molding compounds reinforced with round glass fibers. The combination of low-viscosity polyamides and flat glass fibers allows the production of injection molding parts with an approximately 20-30% lower filling pressure.

TABLE 3

Example 11 and Comparative Example 3 (VB3)

| | | Example | |
|---|---|---|---|
| | | 11 | VB3 |
| Composition | | | |
| PA type A-VK | wt % | 4.0 | 4.0 |
| PA type B | wt % | 31.1 | 31.1 |
| Exolit ® OP 1230 | wt % | 12.0 | 12.0 |
| Melapur ® 200/70 | wt % | 0.5 | 0.5 |
| Alugel 34-TH (aluminum tristearate) | wt % | 0.5 | 0.5 |
| Stabilization/pigment | wt % | 1.9 | 1.9 |
| Glass fibers type A | wt % | 50 | 0 |
| Glass fibers type C | wt % | 0 | 50 |
| Properties | | | |
| MVR (330° C./21.6 kg) | cm³/10 min | 75 | 55 |
| Glass fiber content | wt % | 50.0 | 50.1 |
| Modulus of elasticity | MPa | 17'900 | 17'000 |
| Tensile strength | MPa | 143 | 138 |
| Tensile elongation | % | 1.2 | 1.1 |

TABLE 3-continued

Example 11 and Comparative Example 3 (VB3)

|  |  | Example | |
|---|---|---|---|
|  |  | 11 | VB3 |
| Flow length (330° C./120° C.) | mm | 460 | 315 |
| Fire classification UL-94 (thickness of the test bodies: 0.8 mm) |  | V0 | V0 |

[1] Tension test performed on Biax test bodies

As shown in the comparison of Example 11 and Comparative Example VB3, the flame-retardant molding compound reinforced with (oriented) flat glass fibers can be processed much better than the molding compound reinforced with round glass fibers but otherwise having the same composition. In the case of the inventive Example 11, the resulting flow length is approximately 46% higher.

The invention claimed is:

1. A reinforced polyamide molding compound having a high notched impact strength, consisting of:
   (A) 20 to 60 wt % of at least one partially aromatic polyamide with a DSC melting point (ISO 11357) of at least 270° C., having a solution viscosity, measured in m-cresol (0.5 wt %, 20° C.) of $\eta_{rel}$ less than 1.9, the one or more polyamides selected from the group consisting of:
      polyamide 6T/6I, which contains 50 to 80 mol % hexamethyleneterephthalamide units and 20 to 50 mol hexamethyleneisophthalamide units;
      polyamide 6T/66 which contains 50 to 80 mol % hexamethyleneterephthalamide units and 20 mol % to 50 mol % hexamethyleneadipamide (66) units;
      ternary polyamide 6T/6I/66 containing 50 mol % to 70 mol % hexamethyleneterephthalamide units, 5 mol % to 45 mol % hexamethyleneisophthalamide units and 5 mol % to 45 mol % hexamethyleneadipamide (66) units;
      and mixtures, blends or alloys thereof;
   (B) 40 to 80 wt % of at least one filler consisting of:
      (B1) 20 to 80 wt % flat glass fibers with an elongated shape, where the glass fibers have a noncircular cross-sectional area and a dimension ratio of the main cross-sectional axis to the secondary cross-sectional axis of 2 to 6,
      (B2) 0-30 wt % particulate or stratified fillers,
      (B3) 0-30 wt % boron fibers and/or basalt fibers and/or aramid fibers (p- or m-aramid fibers),
      (B4) 0 to 30 wt % glass fibers with a round cross section,
   wherein the weight percent of each type of filler (B1)-(B4) is based on the entire molding compound; and
   (C) 0 to 20 wt % of additives and auxiliary substances, not including carbon fiber,
wherein the amount of components (A) through (C) in wt % yields 100% together.

2. The polyamide molding compound according to claim 1, wherein no glass fibers with an elongated or oval shape or curved shape with at least one constricted section are present.

3. The polyamide molding compound according to claim 1, wherein glass fibers with a rectangular or almost rectangular cross section are used as the flat glass fibers.

4. The polyamide molding compound according to claim 1, having a high deflection temperature HDTA (1.8 MPa) of at least 260° C.

5. The polyamide molding compound according to claim 1, wherein the flat glass fibers are in the form of short glass (chopped glass) with a length of 2 to 50 mm.

6. The polyamide molding compound according to claim 1, wherein the flat glass fibers are in the form of long glass (rovings).

7. The polyamide molding compound according to claim 1, wherein the flat glass fibers are present in the molding compound in concentrations between 48 and 75 wt % based on the total weight of the molding compound.

8. The polyamide molding compound according to claim 1, wherein the flat glass fibers have a diameter of the main cross-sectional axis of 6 to 40 μm and have a diameter of the secondary cross-sectional axis of 3 to 20 μm, whereby the ratio of the cross-sectional axes perpendicular to each other is in the range of 3 to 6.

9. The polyamide molding compound according to claim 1, wherein the flat glass fibers are selected from the group consisting of E-glass fibers, A-glass fibers, C-glass fibers, D-glass fibers, M-glass fibers, S-glass fibers or R-glass fibers or mixtures thereof.

10. The polyamide molding compound according to claim 1, wherein the one or more polyamides is a polyamide 6T/6I or a polyamide 6T/66 containing at least 52 mol % hexamethylene-terephthalamide units.

11. The polyamide molding compound according to claim 1, wherein the molding compound has notched impact strength of at least 23 kJ/m$^2$ (measured according to Charpy at 23° C. according to ISO 179/2-1 eA) with a glass fiber content of ≧60 wt %, or a notched impact strength of more than 20 kJ/m$^2$ (measured according to Charpy at 23° C. according to ISO 179/2-1 eA) at a glass fiber content of 50 to 60 wt %.

12. The polyamide molding compound according to claim 1, having a high flow length >120 mm, with degrees of reinforcement with component (B) in the range of 40 wt % to 65 wt %.

13. The polyamide molding compound according to claim 1, wherein at least one of the additives and auxiliary substances (C) in the molding compound, is selected from the group consisting of inorganic stabilizers, organic stabilizers, lubricants, dyes, metallic pigments, metal flakes, metal-coated particles, halogenated flame retardants, halogen-free flame retardants, antistatics, conductivity additives, mold release aids, optical brighteners, natural phyllosilicates, synthetic phyllosilicates or mixtures of the aforementioned additives.

14. The polyamide molding compound according to claim 13, wherein the flame retardants are a phosphinate compound contained in an amount of 5 wt % to 20 wt % and a polyphosphate salt are of a 1,3,5-triazine compound contained in an amount of 0.2 wt % to 10 wt %.

15. The polyamide molding compound according to claim 13, wherein at least one of the additives and auxiliary substances (C) in the molding compound is a phosphinate compound as a halogen free flame retardant contained in an amount of 5 wt % to 20 wt %.

16. The polyamide molding compound according to claim 13, wherein the conductivity additives are selected from carbon black and carbon nanotubes.

17. The polyamide molding compound according to claim 13, wherein the flame retardants are a phosphinate compound contained in an amount of 8 wt % to 17.8 wt % and a polyphosphate salt of a 1,3,5-triazine compound contained in an amount of 0.2 wt % to 1.0 wt %.

18. A method for manufacturing the polyamide molding compound according to claim 1, on conventional compounding equipment at set barrel temperatures of 280° C. to 350° C., whereby the polymer component is first melted and then the chopped flat glass fibers and/or the other fillers are added.

19. In a method of injection molding, molding a molding compound according to claim 1 to produce a molded article or part of a molded article, wherein said molding compound has a notched impact strength of more than 20 kJ/m$^2$ (measured according to Charpy at 23° C., according to ISO 179/2-1 eA).

20. The method of claim 19, wherein said molding is carried out by injection molding, extrusion, pultrusion or blow molding.

21. A molded body, an injection-molded part, formed from the molding compound of claim 1.

22. The molded body according to claim 21 in the form of a cellular telephone casing or cellular telephone housing part.

23. The polyamide molding compound according to claim 1, wherein the component (B1) is
    40 to 80 wt %, flat glass fibers with an elongated shape, where the glass fibers have a noncircular cross-sectional area and a dimension ratio of the main cross-sectional axis to the secondary cross-sectional axis of 2 to 6.

24. The polyamide molding compound according to claim 1, wherein the flat glass fibers with an elongated shape have a dimension ratio of the main cross-sectional axis to the secondary cross-sectional axis of 3 to 6.

25. The polyamide molding compound according to claim 1, wherein the flat glass fibers with an elongated shape have a dimension ratio of the main cross-sectional axis to the secondary cross-sectional axis of 3.5 to 5.0.

26. The polyamide molding compound according to claim 1, wherein the flat glass fibers have a diameter of the main cross-sectional axis of 6 to 40 μm and have a diameter of the secondary cross-sectional axis of 3 to 20 μm, whereby the ratio of the cross-sectional axes perpendicular to each other is in the range of 3.5 and 5.0.

27. The polyamide molding compound according to claim 1, wherein the flat glass fibers are selected from the group consisting of E-glass fibers, A-glass fibers, C-glass fibers, D-glass fibers, M-glass fibers, S-glass fibers or R-glass fibers or mixtures thereof, only E- and S-glass fibers, and whereby the fibers are provided with an amino or epoxysilane coating.

28. The polyamide molding compound according to claim 1, wherein the one or more polyamides has a solution viscosity, measured in m-cresol (0.5 wt %, 20° C.), of $\eta_{rel}$ less than 1.8.

29. The polyamide molding compound according to claim 1, wherein the one or more polyamides is selected from the group consisting of:
    polyamide 6T/6I, which contains 62 to 73 mol % hexamethyleneterephthalamide units and 25 to 38 mol % hexamethyleneisophthalamide units;
    polyamide 6T/66 which contains 52 to 62 mol % hexamethyleneterephthalamide units and 38 mol % to 48 mol % hexamethyleneadipamide (66) units;
    and mixtures, blends or alloys thereof.

* * * * *